US006569207B1

(12) United States Patent
Sundaresan (10) Patent No.: US 6,569,207 B1
(45) Date of Patent: May 27, 2003

(54) CONVERTING SCHEMAS TO COMPONENT MODELS

(75) Inventor: Neelakantan Sundaresan, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/166,043

(22) Filed: Oct. 5, 1998

(51) Int. Cl.7 .............................................. G06F 17/00
(52) U.S. Cl. ........................ 715/513; 715/523; 715/522; 707/100
(58) Field of Search ................................. 707/513, 530, 707/10, 501.1, 100, 522–523, 103 R, 104.1; 717/1; 709/217–219

(56) References Cited

U.S. PATENT DOCUMENTS

| | | | |
|---|---|---|---|
| 4,949,253 A | 8/1990 | Chigira et al. | 364/200 |
| 5,269,014 A | 12/1993 | Ogino | 395/500 |
| 5,491,628 A * | 2/1996 | Wakayama et al. | 704/9 |
| 5,530,863 A | 6/1996 | Hino | |
| 5,548,508 A | 8/1996 | Nagami | |
| 5,608,904 A * | 3/1997 | Chaudhuri et al. | 707/2 |
| 5,629,846 A | 5/1997 | Crapo | |
| 5,659,729 A | 8/1997 | Nielsen | |
| 5,715,453 A | 2/1998 | Stewart | |
| 5,802,529 A * | 9/1998 | Nakatsuyama et al. | 707/513 |
| 5,878,411 A * | 3/1999 | Burroughs et al. | 707/102 |
| 5,915,259 A * | 6/1999 | Murata | 707/513 |
| 5,920,879 A * | 7/1999 | Kyojima et al. | 707/517 |
| 5,940,075 A | 8/1999 | Mutschler, III et al. | |
| 6,014,680 A | 1/2000 | Sato et al. | |
| 6,055,522 A * | 4/2000 | Krishna et al. | 705/517 |
| 6,055,526 A * | 4/2000 | Ambroziak | 707/102 |
| 6,226,642 B1 | 5/2000 | Beranek et al. | |
| 6,073,143 A | 6/2000 | Nishikawa et al. | |
| 6,182,092 B1 | 1/2001 | Francis et al. | |
| 6,192,415 B1 * | 2/2001 | Haverstock et al. | 709/245 |
| 6,202,072 B1 | 3/2001 | Kuwahara | |
| 6,272,673 B1 * | 8/2001 | Dale et al. | 717/1 |
| 6,418,441 B1 * | 7/2002 | Call | 707/10 |

OTHER PUBLICATIONS

Budinsky, F.J., et al, "Automatic Code Generation form Design Patterns," IBM Systems Journal, vol. 35, No. 2, 1996, pp. 151–171.
Bosak, Jon. XML, Java, and the Future of the Web. Oct. 2, 1997. http://www.xml.com/pub/a/w3j/s3.bosak.html. pp. 1–13.*
E. Willner, "Preparing Web data with XML," Information Today, 15(7):Jul./Aug. 1–6, 1998.
T. Bray et al., "Extensible Markup Language (XML): Part 1. Syntax," http://www.w3.org/TR/WD-xml-lang-970331, Mar. 31, 1997, pp. 1–40.
"SGML tool: One document, several formats," Computer World, Microstar Software Lt., Sep. 9, 1996, 30(37):58.
J. Senna, "XML bridges the gap," InfoWorld, Jun. 1, 1998, 20(22):88–90.
Jones, Carol A., "BeanMachine for the Web", IBM Internet article available at http://www.ibm.com/java/education/beanmachine.html. (5 pages), Jan. 1998.
Bray, Tim. "Extensible Markup Language (XML): Part 1. Syntax" http://www.w3.org/TR/WD-xml-lang-970331. Mar. 31, 1997. pp. 1–40.*
Kirsanov, Dmitry. "XML DTDs and Valid XML Documents" http://www.webreference.com/dlab/books/html/38-3.html. Jun. 16, 1997. pp. 1–5.*
Bray, Tim. "Document Content Description for XML" http://www.w3.org/TR/NOTE-dcd. Jul. 31, 1998. pp. 1–21.*

* cited by examiner

*Primary Examiner*—Joseph H. Feild
(74) *Attorney, Agent, or Firm*—Gates & Cooper LLP (57) ABSTRACT

A system for automatically generating class specifications from eXtensible Markup Language (XML) schemas and then automatically instantiating objects from those class specifications using data contained in XML documents.

66 Claims, 3 Drawing Sheets

CONVERTING SCHEMAS TO COMPONENT MODELS

CROSS-REFERENCE TO RELATED APPLICATIONS

This application is related to the following co-pending and commonly-assigned patent applications:

application Ser. No. 09/166,018, entitled "A PATTERN MATCHING AND REPLACEMENT LANGUAGE FOR TRANSFORMING DOCUMENTS," filed on Oct. 5, 1998, by Neelakantan Sundaresan, U.S. Pat. No. 6,487,566; and application Ser. No. 09/166,042, entitled "A FACILITY FOR ADDING DYNAMISM TO AN EXTENSIBLE MARKUP LANGUAGE," filed on Oct. 5, 1998, by Susan B. Lee and Neelakantan Sundaresan, U.S. Pat. No. 6,480,865;

both of which applications are incorporated by reference herein.

BACKGROUND OF THE INVENTION

1. Field of the Invention

This invention relates in general to generating Web content, and in particular, to a method for converting extensible Markup Language (XML) schemas to component models for use in an object-oriented system.

2. Description of Related Art

Extensible Markup Language (XML) is poised to be the next big revolution for the World Wide Web (WWW). With the realization that the Web is not about just browsing any more, XML has emerged as an enabling technology to carry the Web to the next generation of electronic commerce, Web-based workflow, and integration of databases with Web applications.

XML describes a class of data objects called XML documents and partially describes the behavior of computer programs that process them. XML is a restricted form of SGML, the Standard Generalized Markup Language, defined in ISO 8879. The specification for XML can be found at the URL: http://www.w3.org/TR/REC-xml.

XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure.

An XML schema specifies constraints on the structures and types of elements in an XML document. The basic schema for XML is the DTD (Document Type Definition). Other XML schema definitions are also being developed, such as DCD (Document Content Definition), XSchema, etc. Information concerning DTD and DCD can be found at the URL: http://www.w3.org/.

The main difference between DTD and DCD is that DTD uses a different syntax from XML, while DCD specifies an XML schema language in XML itself. (XSchema is similar to DCD in this respect). In spite of the differences in the syntax, the goals and constraint semantics for all these XML schema languages are the same. Their commonality is that they all describe XML Schema. This means that they assume the common XML structure, and provide a description language to say how these elements are laid out and are related to each other.

There are about five basic constraints that the XML schema languages describe:

1. The attributes that an element should/may contain:
   a. the types of the attribute values (mainly string types), and
   b. the mandatory or optional nature of occurrences of these attributes.
2. The type and the order in which elements can be contained inside another element (the content model of the element):
   a. the sub-element should of a certain name or type or that a sub-element could be of any type,
   b. a regular expression system to express how these elements occur, wherein this regular expression system can be expressed by the following operators:
      i. |:A|B (either element of type A or of type B can occur),
      ii. ,:A, B (element of type B follows one of type A),
      iii. *:A* (zero or more occurrence of element of type A),
      iv. +:A+ (one or more occurrence of element of type A),
      v. ?:A? (zero or one occurrence of element of type A),
      vi. ( ):( . . . , ) (grouping of expressions in this system).

An EBNF (Extended Backus-Naur Form) for this regular expression system can be expressed as below:

re=>A
|re|re
|re, re
|re*
|re+
|re?
|(re)
|ANY

Note that this system includes some convenience operators. For example, A+ is the same as A, A*.

A software module called an XML processor is used to read XML documents and provide access to their content and structure. It is assumed that an XML processor is doing its work on behalf of another module, called the application. The XML specification located at the URL noted above describes the required behavior of an XML processor in terms of how it must read XML data and the information it must provide to the application.

In a typical application that uses XML for a particular specification, there would be a DTD that specifies the XML schema and one or more XML documents that satisfy that schema. The application would typically convert the XML document into an object. The application programmer would typically write several lines of code to read in the XML document based upon the schema, to get and set elements and properties based upon the schema, and to notify other parts of the application when an element in the document changes.

It can be seen, then, that there is a direct correspondence between XML schemas and Java classes, as well as XML documents and Java objects. However, when application programmer manually writes this programming, it is painstaking, and error-prone. Thus, there is a need in the art for a well-tested system that can automatically generate this programming.

Of course, automatic program generation is known in the art. For example, in U.S. Pat. No. 4,949,253, Chigira and Yokoyama describe an automatic program generation method and apparatus in a computer program development support system having an input unit for inputting input information relating to data declaration and manner of use of data, a memory unit for storing a plurality of program part prototypes, each including modifyable information and a processing unit for generating a program part from a program part prototype, wherein the input information is analyzed, one of the program part prototypes stored in the memory unit is selected in accordance with the analysis of the input information, and the selected program part prototype is substituted in accordance with the analysis of the input information to generate a program.

In another example, in U.S. Pat. No. 5,269,014, Ogino describes an an automatic programming system that seeks to maximize the automation of software development. This automatic programming system includes capability to trade-off program structure so as to optimize the structure to fulfill requested software specification requirements. The system also includes an ability to perform failure mode and effect analysis and design review. The design operation and testing operations are directly coupled to each other so that the design data may be utilized effectively during testing In yet another example, in the publication by Budinsky, Finnie, Vlissides, entitled "Automatic code generation from design patterns", IBM Systems Journal Vol. 35, No. 2- 1996, the authors describe a method to generate code from design patterns.

In all of these systems, the user has to explicitly write specifications or prescriptions for the purpose of code generation. There is no way to automatically extract information for component code generation. Specifically, there is a need for a system that can generate Java classes using XML schemas and then instantiate Java objects using XML documents.

SUMMARY OF THE INVENTION

To overcome the limitations in the prior art described above, and to overcome other limitations that will become apparent upon reading and understanding the present specification, the present invention discloses a system for automatically generating class specifications from XML schemas and then automatically instantiating objects from those class specifications using data contained in XML documents.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural and functional changes may be made without departing from the scope of the present invention.

OVERVIEW

The preferred embodiment of the present invention describes a system for automatically generating class specifications from XML schemas and then automatically instantiating objects from those class specifications using data contained in XML documents.

Because of the fact that most XML schemas are described as Document Type Definitions (DTDs), the preferred embodiment of the present invention concentrates on DTD-based XML schemas, although an alternative embodiment describes how to convert schemas based on Document Content Definitions (DCDs) to components. For the component language, the preferred embodiment of the present invention focuses on Java, since Java is commonly used in the context of the Web, although an alternative embodiment could use other object-oriented languages.

HARDWARE ENVIRONMENT

Figure 1:
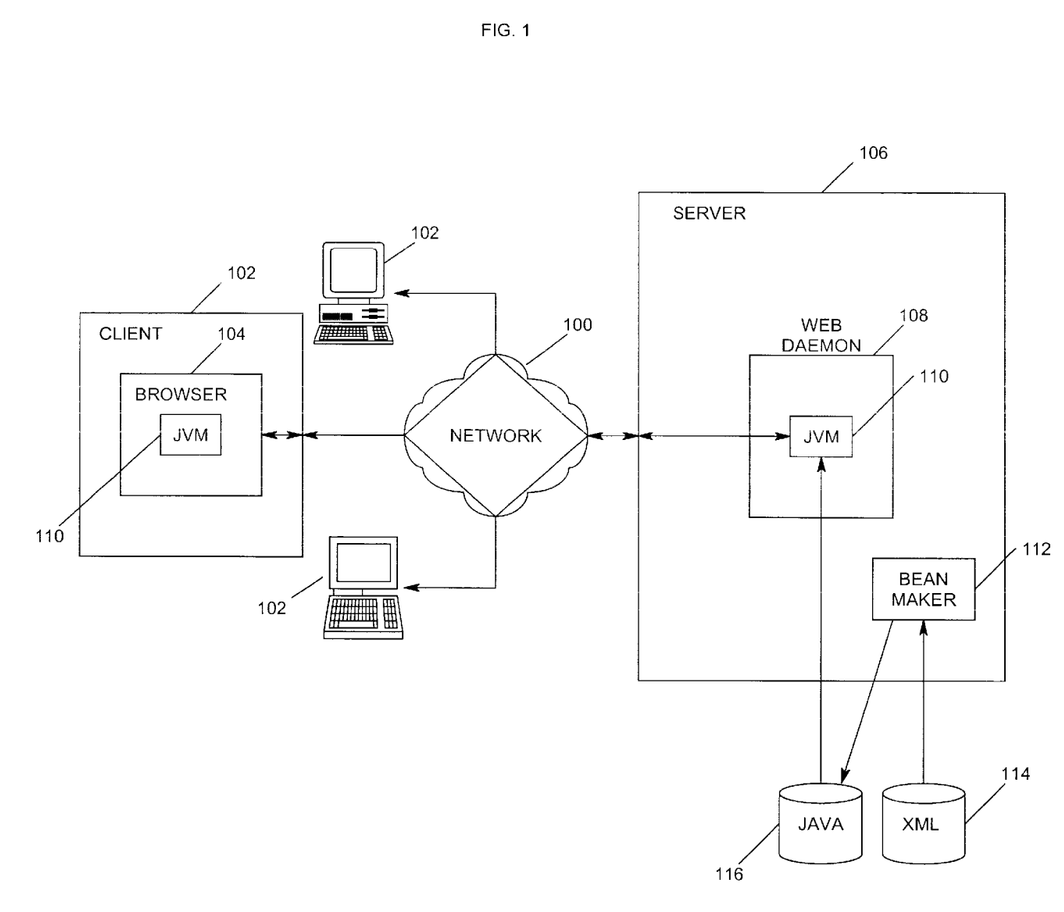
FIG. 1 is a block diagram that illustrates an exemplary client-server hardware environment that could be used by the preferred embodiment of the present invention.

FIG. 1 schematically illustrates an exemplary hardware environment that could be used with the preferred embodiment of the present invention, and more particularly, illustrates a typical distributed computer system using the Internet 100 to connect client systems 102 executing Web browsers 104 to server systems 106 executing Web daemons 108. A typical combination of resources may include clients 102 that are personal computers or workstations, and servers 106 that are personal computers, workstations, minicomputers, or mainframes. These systems are coupled to one another over a network 100, which may include other networks such as LANs, WANs, SNA networks, as well as the Internet.

Either or both of the Web browser 104 and Web daemon 108 may include a Java Virtual Machine (JVM) 110 that executes Java objects, applets, scripts, etc., associated with various Web content. The server system 106 may further include one or more BeanMakers 112 that use XML schemas and documents 114 to create and instantiate Java class specifications and objects 116 therefrom, respectively.

In general, the BeanMaker 112 comprises data and/or instructions which, when read and executed by the server computer 106, cause the computer 106 to perform the steps for performing and/or using the present invention. Generally, the data and/or instructions are embodied in and/or readable from a device, carrier or media, such as memory, data storage devices, and/or remote devices coupled to the computer via a data communications device.

However, those skilled in the art will recognize that the exemplary environment illustrated in FIG. 1 is not intended to limit the present invention. Indeed, those skilled in the art will recognize that other alternative hardware environments may be used without departing from the scope of the present invention.

Thus, the present invention may be implemented as a method, apparatus, or article of manufacture using standard programming and/or engineering techniques to produce software, hardware, firmware, or any combination thereof. In addition, the term "article of manufacture" as used herein is intended to encompass logic and/or data embodied in or accessible from any device, carrier, or media.

OPERATION OF THE INVENTION

The BeanMaker 112 converts an arbitrary DTD into Java classes. Preferably, the BeanMaker 112 looks at every element of a DTD as a Java Bean. Java Beans define a software component model for the Java language, so that Java components from various sources can be easily combined to create applications. Detailed information concerning Java Beans can be found at http://www.javasoft.com.

According to the preferred embodiment of the present invention, the attributes and the elements of the DTD become the properties of the corresponding Java Bean.

Following is an example DTD:

```
<!ELEMENT A B>
<!ATTLIST A
    prop1 CDATA #REQUIRED
    prop2 CDATA #IMPLIED>
```

From the above example DTD, the BeanMaker 112 generates Java classes A and B corresponding to elements A and B. Java class A has three properties, i.e., properties prop1 and prop2 (both of type String), and a property of type B; Java class B has one property, i.e., a property of type B.

From Elements to Classes

Consider an element definition of the form:

```
<!ELEMENT foo ...>
```

The BeanMaker 112 generates a Java class with name Foo. By default, the BeanMaker 112 converts the first character to be upper case. For hyphenated words like gcs-config, the BeanMaker 112 generates compound words where each simple portion starts with an upper case letter (GcsConfig for gcs-config, for example).

The BeanMaker 112 allows the user to specify what the name of the class should be corresponding to each element using an optional customization specification.

From Attributes to Properties

DTDs can specify that attributes have one of three different declarations: (1) an attribute may be mandatory (#REQUIRED), (2) an attribute may be optional (#IMPLIED), or (3) an attribute could have a fixed value (#FIXED).

For an attribute Attr which is #REQUIRED, the BeanMaker 112 generates the methods getAttr and setAttr for getting and setting the value of the property corresponding to the attribute, respectively. Note that these methods are generated for the class corresponding to the element that specifies these attributes.

For an attribute Attr which is #IMPLIED, since the attribute may not be present, BeanMaker 112 also generates hasAttr and removeAttr methods for checking whether the property exists and for removing the property.

For an attribute Attr which is #FIXED, the BeanMaker 112 only generates a getAttr method. Since the attribute can have only a fixed value, the attribute corresponds to a constant property whose value cannot be changed after the Java Bean is created.

In the above examples, all the attribute types are strings. However, if the attributes are declared using entities, then a class corresponding to the entity names can be generated and the property can be specified to be of that type.

Consider an example DTD as follows:

```
<!ATTLIST A
    Attr CDATA #REQUIRED>
```

The type of the Attr property is String resulting in methods of the form:

```
String getAttr( )
{
    ...
}
void setAttr(String)
{
    ...
}
```

Consider another example where a class named Boolean is generated which corresponds to the enumerated types true and false:

```
<!ENTITY %boolean "(true/false)">
<!ATTLIST A
    attr %boolean; #REQUIRED>
```

The BeanMaker 112 also accepts input from the user in the form of optional customization specifications that define what class names to generate for each entity type.

The BeanMaker 112 can also generate adapter functions that convert data types. This is a powerful facility that allows the BeanMaker 112 to overcome the lack of typing in DTDs. Other XML schemas support basic data types like integer, floating point, etc., so the BeanMaker 112 can automatically generate better data types. Even here, providing for user-specified data types allows for better customization.

From Contained Elements to Properties

As discussed above, the declaration of elements within an element form a regular expression language. The BeanMaker 112 appropriately generates classes from this regular expression language.

The following regular expression operators are recognized by the BeanMaker 112:

1. *(zero or more),
2. +(one or more),
3. |(one or the other),
4. ,(one followed by the other)
5. ?(zero or one)
6. ( ) (grouping)

In addition, the element declaration ANY is recognized.

Based upon the regular expression, the BeanMaker 112 generates appropriate property types and classes for the class corresponding to the enclosing element. Thus, for every element B that can occur inside element A, the corresponding class for A has methods getB and setB.

Zero or One: A?

If B is optional (this is indicated by B? in the content model of A), additional methods such as hasB and removeB are generated.

Zero/One or More: A*/A+

Regular expressions such as A* or A+ that indicate multiple instances of an element result in indexed properties. When a content model contains expressions of the form A* or A+, the BeanMaker 112 generates indexed property methods of the form getAs( ), which returns A[ ], and setAs(A[ ]). Also, it generates other indexed property methods, such as setAs(int I, A a) to set the I-th element of A to value a and A getAs(int I) to get the I-th element value of A.

Note that the name As, corresponding to element type A, indicates an index property list of A objects and can also be customized through a user-specified properties file. For example, some users may prefer Alist or Array instead of As. The BeanMaker 112 allows for this customization.

One or the Other: A|B

When an element has a content model of the form A|B, an element of type A or type B may occur inside of it. The enclosing Java Bean may have a property of Bean type A or Bean type B. The BeanMaker 112 generates a class with name A or B to indicate these types. It also generates hasA and hasB methods to determine whether the enclosing Java Bean has an A or a B.

One followed by the Other: A, B

When an element has a content model of the form A, B (A followed by B), the element with this content model contains both A and B and in that order. Typically, the order does not matter. Application programmers may use the content model (A, B|B, A) to indicate that A may come before B or B may come before A. However, many times application programmers may leave it as A, B and just force the users of their application to follow this order. In any case, many times it is intended that it is either A|B or B|A. In general, the BeanMaker 112, by default, treats the sequence A1, A2, . . . An to be any permutation of this sequence, and, corresponding to this sequence, for each Ai, the BeanMaker 112 generates Ai getAi( ) and setAi(Ai ai) methods. On the other hand, the user may specify if he/she does not want this relaxation of the ordering and wants to enforce the ordering strictly.

Grouping: (A)

Grouping is often used to group multiple elements in the content model to jointly apply any of the above-mentioned operators, such as ?, *, +, etc., to them jointly, thus overriding the default precedence conditions of the BeanMaker 112. The BeanMaker 112, by default, generates a class __A__ for (A). This ensures that the class name generated for A, B* is different from the one generated for (A, B)*. The user can specify in a properties file what should be used as the delimiting strings instead of the underscores.

The BeanMaker 112 does not generate unnecessary underscores delimiting the class names. For example, DTDs often include unnecessary parentheses around element expressions, for safety or readability purposes. The BeanMaker 112 eliminates unnecessary underscores. Thus, ((A)) is to be treated the same as (A).

The ANY Content Model

When the DTD specifies an ANY content model, this means that the element can contain elements of any type. The BeanMaker 112 maps the ANY content model to an array of Object types in Java.

The EMPTY Content Model

When an element is declared to be EMPTY, the only properties of the corresponding Java Bean are the properties corresponding to the attributes of the element. Since there are no sub-elements, there are no other properties.

Event Model

The Event model is an important part of the Java Bean specification. The Java Bean event model follows the model-view-controller (PVC) paradigm. Events are generated when a Java Bean's property changes and other Java Beans can register to listen for the changes to these properties. When a property of a particular type with a Java Bean changes, the event listeners are notified through an appropriate event object. Properties that change and result in the Java Bean notifying other Java Beans are called bound properties; constrained properties are those changes that can be vetoed by the listeners.

The BeanMaker 112 creates all property types to be both constrained and bound. Every set method triggers a PropertyChange event and VetoableChange event. This accommodates both kinds of listeners, i.e., ones that only listen to the changes and others that can actually veto changes. This may cause some performance bottlenecks, but is the most general actions to perform. The user can specify what kind of property (bound or constrained) needs to be generated for each of the properties corresponding to the attributes and elements in the optional customization specification.

Generating Interfaces

In addition to generating Java Bean classes, the preferred embodiment also provides an object-oriented mechanism to access and modify Java equivalents of an XML DTD. It would be more useful if these classes implemented a Java Bean interface corresponding to the DTD.

The BeanMaker 112 generates Java interfaces and the generated Java Bean classes implement these interfaces. Thus, the Java Bean classes that are generated are default implementations of the Java Bean interfaces.

An application programmer can just use the interface classes as stub code to which he/she could write an implementation class, thus ignoring the default implementation class that is generated by the BeanMaker 112. Thus, there can be different kinds of Java Bean implementations implementing the same interface and the Java Bean class that was discussed earlier would be just a special case of this interface. The application programmer can use this interface APIs and bundle his/her own Java Beans that have the same interface but a different implementation.

Given a DTD foo.dtd with a root element named bar, the BeanMaker 112 generates a file called BarInterface.java which contains the Java interfaces for bar and the elements contained within bar. For each attribute or element that becomes a property or an indexed property, appropriate get, set, has, remove, and add contract methods are generated as described below:

has methods are generated only for those properties whose occurrence is optional (?, * operators in the DTDs);

add methods are generated only for those elements that correspond to indexed properties (*, + operators in the DTD);

get methods are generated for all property types; for indexed property types, get methods are generated to get a property value at a particular index and also to get the number of instances of the property objects;

remove methods are generated for properties whose occurrence is optional (the ? and * operators in the DTD); for indexed properties, remove methods are generated to remove a property instance at a particular index; for indexed properties that are optional (the * operator in the DTD), removeAll methods are also generated; set method generation is similar to the get methods.

Generating Bean Classes

Given a DTD foo.dtd with a root element as bar, the BeanMaker 112 generates a file called Bar.java, which contains a Java Beans class called Bar. All the classes corresponding to elements inside of Bar are generated as Java inner classes in Bar. The Bar class implements the BarInterface interface. The inner classes inside Bar implement the corresponding interfaces inside the BarInterface interface. The implementation of the has, get, set, remove, etc., methods described above in the previous section are generated as well.

Bean Instances

The BeanMaker 112 also generates Handler Java Bean classes for reading an XML specification that satisfies the DTD and automatically building the Java Bean instances corresponding to the class files generated above. These Java Bean classes can be used by the application programmer to build Java Bean instances easily.

How the BeanMaker Works

Figure 2:
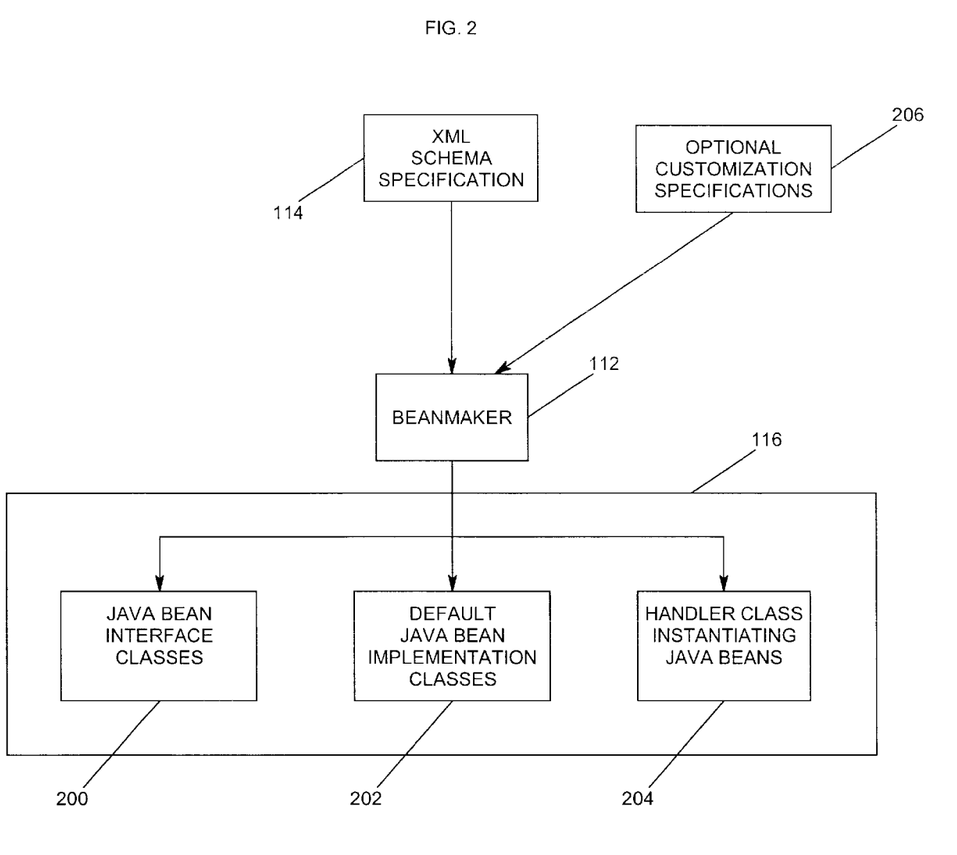
FIG. 2 is a block diagram that illustrates how a Bean-Maker creates Java class specifications from XML schemas.

FIG. 2 is a block diagram that illustrates how the BeanMaker 112 creates the Java class.specifications 116 from XML schemas 114. The BeanMaker 112 interprets a DTD schema 114, e.g., the foo.dtd file with the root element bar, and generates a reusable Java Beans interface class specification (e.g., BarInterface.java) 200, a default Java Beans implementation class specification (e.g., Bar.java) 202, and a Java Beans handler class specification (e.g., BarHandler.java) 204 that create Java Beans instances 116 from the contents of any XML document 114.

The application programmer can use the reusable Java Beans interface class specification (e.g., BarInterface.java) 200 to write arbitrary Java Bean classes that satisfy this interface 204. The application programmer can also directly use the default Java Beans implementation class specification (e.g., Bar.java) 202, which is the default Java Beans implementation.

Figure 3:
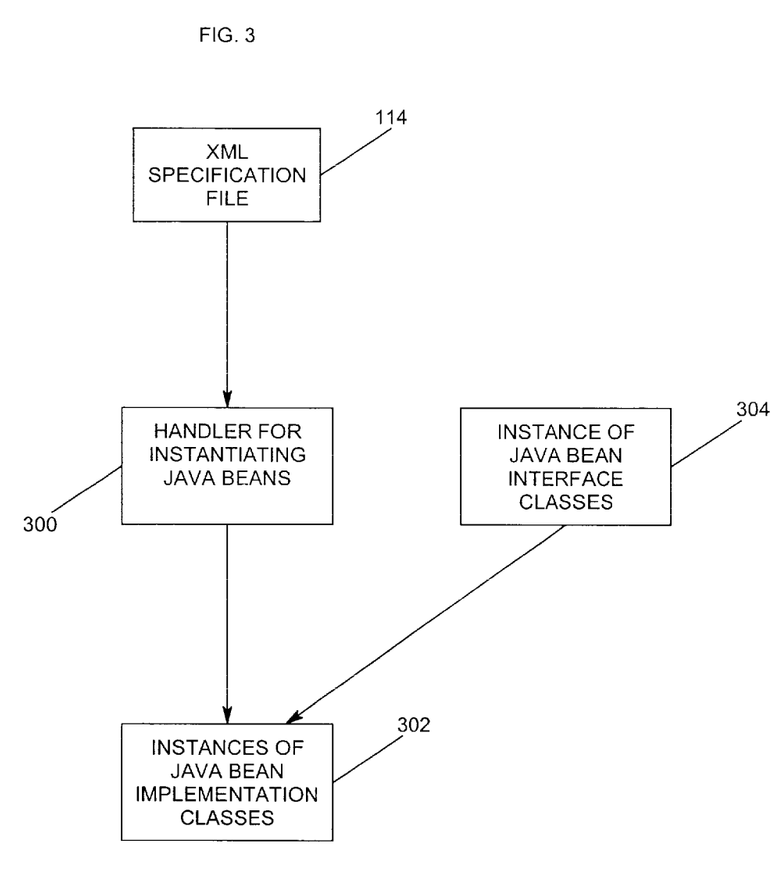
FIG. 3 is a block diagram that illustrates how the Bean-Maker instantiates Java objects from XML documents using the Java class specifications.

FIG. 3 is a block diagram that illustrates how the BeanMaker 112 instantiates Java objects 116 from XML documents 114 using the Java class specifications 116. Specifically, to create Java Beans objects 116 from XML documents 114, the application programmer would use the instances 300 of the Java Beans handler class specifications (e.g., BarHandler.java) 204, which create the Java Beans objects 116, which are instances 302 of the default Java Beans implementation class specifications (e.g., Bar.java) 202, or instances 304 of classes which are hand-implemented by the application programmer to the interface in the reusable Java Beans interface class specification (e.g., BarInterface.java) 200, by reading an XML specification 114.

Optimization and Aesthetics Issues

The BeanMaker 112 attempts to solve a number of correctness, optimization, and aesthetics related issues when generating Java Beans from the schema specification.

As stated above, often when the programmer specifies A, B in the content model, he/she means ((A, B)|(B, A) ). Sometimes, the programmers try and specify this explicitly. But, when the list gets long and complicated, as in A*, B?, C+, the programmer has to specify explicitly multiple combinations and the user may miss out some combinations.

The BeanMaker 112 automatically takes care of these combinations by default. Thus, when it sees A, B, the BeanMaker 112 automatically assumes B, A also. However, this may not be a correct assumption in all situations.

When some element occurs multiple times in a sequence, as in - A, B, A -, it converts that element to an indexed property, thus making A an indexed property and causing an error when the user tries to add more than two elements of type A.

The BeanMaker 112 also gets rid of unnecessary grouping parentheses. Thus, instead of generating __A__ (two underscores on each side) for ((A)), it generates only one on each side. Also, when the parentheses are unnecessary, it makes sure it does not generate the underscores.

Using Entity Declarations to Generate Better Class Names

Entity declarations are used in DTDs to give a name to a commonly used content model for elements or attributes. Consider the following example:

```
<!ENTITY %bool "(true/false)">
<!ELEMENT foo EMPTY>
<!ATTLIST foo
    present %bool; #REQUIRED>
```

In the above example, the present attribute can take values "true" or "false". Consider another example:

```
<!ENTITY %D "(B|C)">
<!ELEMENT A (%D;)>
```

The above example can also be defined as:

```
<!ELEMENT A (B|C)>
```

Further, the BeanMaker 112 can generate a class D instead of generating a class named BorC. Since an Entity was used, for better readability in the DTD, generating a class name corresponding to the entity name provides for better readability.

Aesthetics Check: NotBean Worthy Exception

Some schema specifications, even though syntactically and semantically correct, may not generate neat components. These include complicated regular expression patterns where the element lists are repeated without any proper structure to them. Typically, these are badly written DTDs. Other examples include long chains of element containment where A contains only B, B contains only C, and so on. It implies a chain of Java Beans that contain only one bean and some of the beans in this chain can be eliminated. Some of the exceptions are due to the fact that the Java Beans cannot be generated; the others are due to the fact that the Java Beans are aesthetically unappealing.

Customization

The application programmer can specify a number of customizations through a customization specification file. If such a specification file is not provided, the BeanMaker 112 generates Java Beans class specifications according to its default behavior.

Generating Names Corresponding to the Regular Expressions

The user can customize the prefixes/suffixes generated for names, corresponding to the different regular expression operators that generate prefixes or suffixes. The customization specification itself can be an XML specification as shown in the example below:

```
<!ELEMENT decorator EMPTY>
<!ATTLIST decorator
        OR      CDATA #IMPLIED
        GROUP   CDATA #IMPLIED
        COMMA   CDATA #IMPLIED
        STAR    CDATA #IMPLIED
        PLUS    CDATA #IMPLIED>
<decorator OR="or"
        GROUP="-"
        COMMA=","
        STAR="list"
        PLUS="list">
```

For example, using the above specification, the BeanMaker 112 generates the class name AorB when it generates a class for "(A|B)", generates the class name Alist for A*, and so on.

Name generator corresponding to Element Names

By default, the BeanMaker 112 generates the same class name as the element name. The application programmer might prefer a different class name than an element name, either to avoid clashing with already existing classes or to avoid long names being generated.

Consider the following example:

```
<!ELEMENT long-named-element
    (long-named-subelement1 | long-named-subelement2)>
```

This will result in the generation of a class LongNamedElement with a property whose class name is LongNamedElementIorLongNamedElement2. The user, in the customization specification file, can say what names he would like. The DTD in the customization specs corresponding to element name generation would look like:

```
<!ELEMENT name-generator (pair)*)>
<!ELEMENT pair EMPTY>
<!ATTLIST pair
    element-name CDATA #REQUIRED
    class-name CDATA #REQUIRED>
```

Corresponding to the example given above, the application programmer can provide a specification of the following form:

```
<name-generator>
    <pair element-name="long-named-element"
        class-name="Elt"/>
    <pair element-name="long-named-subelement1"
        class-name="SubElt1"/>
    <pair element-name="long-named-subelement2"
        class-name="SubElt2"/>
</name-generator>
```

Customizing FileNames, Class and Interface names, and Package Names

The BeanMaker 112, by default, for a root element bar, creates an interface BarInterface, a default implementation Bar class, and instance creators BarHandlers. The application programmer can customize this by specifying what kind of names they want generated using the following DTD specification.

```
<!ELEMENT class-names EMPTY>
<!ATTLIST class-names
    interface CDATA #IMPLIED
    default-class CDATA #IMPLIED
    handlers CDATA #IMPLIED>
```

For example, the user can say that he/she would like BarInt, BarClass, and BarCreator for the three classes discussed above by the following XML specification:

```
<class-names interface="BarInt"
    default-class="BarClass"
    handlers="BarCreator"/>
```

The user can also specify the package name for the generated classes; by default, the BeanMaker 112 creates a package named after the DTD file. Thus, if the DTD file is foo.dtd, then the BeanMaker 112 creates puts all the files generated in a package named foo. The application programmer can specify the name in the customization specs file using the following DTD:

```
<!ELEMENT generated-package EMPTY>
<!ATTLIST generated-package
    name CDATA #REQUIRED>
```

For example, the application programmer can specify that the generated classes should be placed within the package "com.ibm.almaden.gc.sConfig" using the following XML document:

```
<generated-package name="com.ibm.almaden.gcsConfig"/>
```

Interaction with Other Bean Tools

The BeanMaker 112 can interact with other Java Beans editing tools, such as the BeanMachine™ available from IBM Corporation. Generally, these editing tools provide a visual environment for editing and connecting Java Beans. The Java Bean classes generated by the BeanMaker 112 usually can be imported into these editing tools, edited as desired, and combined with other Java Beans.

Embedding Beans Specifications in Script Files

When the XML specifications are embedded in script files, HTML pages, servlet and Java server pages, there are several ways to use XML specifications with HTML in the browser and server side.

Either the classes associated with the DTD files (that are automatically generated by the BeanMaker 112) can be pointed to from the HTML pages and instances can be created using attached Java scripts. These classes get loaded on the server or the browser side, as the case may be.

On the server side, they are replaced by the results of running the Java Bean to be sent to the client (similar to servlets). On the browser side, the Java Bean class may get downloaded (as in an applet) and the surrounding script can interact with the Java Bean.

Alternatively, and more interestingly, the BeanMaker 112 itself can be deployed as a part of the server or the browser. Thereafter, whenever the HTML pages include embedded XML specifications with associated DTDs, the Java Bean classes and objects are dynamically to interact with the surrounding scripts and with other components.

CONCLUSION

This concludes the description of the preferred embodiment of the invention. The following describes some alternative embodiments for accomplishing the present invention. For example, any type of computer, such as a mainframe, minicomputer, or personal computer, could be used to implement the present invention. In addition, the present invention is not limited by specific document or programming languages, and could comprise languages other than XML and Java. For example, the present invention could also be used with HTML, SGML, NetRexx, VisualBasic Script, XML, Perl, C, C++, Cobol, etc.

In summary, the present invention discloses a method, apparatus, and article of manufacture for automatically generating class specifications from XML schemas and then automatically instantiating objects from those class specifications using data contained in XML documents.

The foregoing description of the preferred embodiment off the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A method for converting document schemas to component models for use in an object-oriented computer system, comprising the steps of:
   (a) generating one or more object-oriented class specifications in the computer system from one or more document schemas; and
   (b) instantiating one or more objects in the computer system from the class specifications using data contained in one or more documents, wherein the one or more documents comply with the one or more document schemas.

2. The method of claim 1 above, wherein the documents are Extensible Markup Language (XML) documents and the schemes are XML schemas.

3. The method of claim 2 above, wherein the schemas are selected from a group including Document Type Definition (DTD) schemas and Document Content Definition (DCD) schemas.

4. The method of claim 1 above, wherein the class specifications comprise Java class specifications.

5. The method of claim 1 above, wherein the generating step further comprises converting an element defined in the schema into the class specification.

6. The method of claim 1 above, wherein the generating step further comprises converting an attribute in the schema into a property of the class specification.

7. The method of claim 6 above, wherein the attribute is selected from a group comprising a mandatory attribute, an optional attribute, and a fixed value attribute.

8. The method of claim 7 above, wherein the attribute is a mandatory attribute and the generating step further comprises the step of generating set and get methods for the property corresponding to the mandatory attribute, wherein the set method sets a value of the property and the get method gets the value of the property.

9. The method of claim 7 above, wherein the attribute is an optional attribute and the generating step further comprises the step of generating has and remove methods for the property corresponding to the optional attribute, wherein the has method determines whether the property exists in the object and the remove method removes the property from the object.

10. The method of claim 7 above, wherein the attribute is a fixed value attribute, and the generating step further comprises the step of generating a get method for the property corresponding to the fixed value attribute, wherein the get method retrieves a constant value of the property.

11. The method of claim 1 above, wherein the generating step further comprises the step of generating the class specifications in the computer system from the schemas and one or more optional customization specifications.

12. The method of claim 11 above, wherein the optional customization specifications define what class names to generate for each entity type.

13. The method of claim 1 above, wherein the generating step further comprises the step of generating adapter functions that convert data types in the class specification.

14. The method of claim 1 above, wherein the generating step antler comprises the step of generating the class specifications from a regular expression language comprising one or more declarations of elements enclosed within an element.

15. The method of claim 14 above, wherein the regular expression language includes one or more regular expression operators selected from a group comprising:
   (1) a "zero or more" operator,
   (2) a "one or more" operator,
   (3) a "one or the other" operator,
   (4) a "one followed by the other" operator,
   (5) a "zero or one" operator,
   (6) a "grouping" operator, and
   (7) an "any" operator.

16. The method of claim 14 above, wherein the generating step further comprises the step of optimizing the regular expression language prior to generating the class specifications.

17. The method of claim 14 above, wherein the optimized regular expression language is aesthetically appealing.

18. The method of claim 14 above, wherein the generating step further comprises the step of generating appropriate property types and class specifications for the class specification corresponding to an enclosing element.

19. The method of claim 1 above, wherein the class specifications follow an event model.

20. The method of claim 1 above, wherein the generating step further comprises the step of generating one or more properties having a property type for the class specification, wherein the property type is selected from a group comprising constrained and bound property types, wherein a change to a property that is constrained can be rejected by another class specification, and a change to a property that is bound results in notifying another class specification of the change.

21. The method of claim 1 above, wherein the class specifications include one or more specifications selected from a group comprising (1) a reusable interface class specification, (2) a default implementation class specification, and a handler class specification.

22. The method of claim 1 above, wherein the document is embedded in a script file.

23. An apparatus for converting document schemas to component models for use in an object-oriented computer system, comprising:
   (a) a computer, and
   (b) a translator, executed by the computer, for generating one or more object-oriented class specifications in the computer system from one or more document schemas; and for instantiating one or more objects in the computer system from the class specifications using data contained in one or more documents, wherein the one or more documents comply with the one or more document schemas.

24. The apparatus of claim 23 above, wherein the documents are eXtensible Markup Language (XML) documents and the schemes are XML schemas.

25. The apparatus of claim 24 above, wherein the schemas are selected from a group including Document Type Definition (DTD) schemas and Document Content Definition (DCD) schemas.

26. The apparatus of claim 23 above, wherein the class specifications comprise Java class specifications.

27. The apparatus of claim 23 above, wherein the generating by the translator further comprises converting an element defined in the schema into the class specification.

28. The apparatus of claim 23 above, wherein the generating by the translator further comprises converting an attribute in the schema into a property of the class specification.

29. The apparatus of claim 28 above, wherein the attribute is selected from a group comprising a mandatory attribute, an optional attribute, and a fixed value attribute.

30. The apparatus of claim 29 above, wherein the attribute is a mandatory attribute and the generating by the translator further comprises generating set and get methods for the property corresponding to the mandatory attribute, wherein the set method sets a value of the property and the get method gets the value of the property.

31. The apparatus of claim 29 above, wherein the attribute is an optional attribute and the generating by the translator further comprises generating has and remove methods for the property corresponding to the optional attribute, wherein the has method determines whether the property exists in the object and the remove method removes the property from the object.

32. The apparatus of claim 29 above, wherein the attribute is a fixed value attribute, and the generating by the translator further comprises generating a get method for the property corresponding to the fixed value attribute, wherein the get method retrieves a constant value of the property.

33. The apparatus of claim 23 above, wherein the generating by the translator further comprises generating the class specifications in the computer system from the schemas and one or more optional customization specifications.

34. The apparatus of claim 33 above, wherein the optional customization specifications define what class names to generate for each entity type.

35. The apparatus of claim 23 above, wherein the generating by the translator further comprises generating adapter functions that convert data types in the class specification.

36. The apparatus of claim 23 above, wherein the generating by the translator further comprises generating the class specifications from a regular expression language comprising one or more declarations of elements enclosed within an element.

37. The apparatus of claim 36 above, wherein the regular expression language includes one or more regular expression operators selected from a group comprising:
  (1) a "zero or more" operator,
  (2) a "one or more" operator,
  (3) a "one or the other" operator,
  (4) a "one followed by the other" operator,
  (5) a "zero or one" operator,
  (6) a "grouping" operator, and
  (7) an "any" operator.

38. The apparatus of claim 36 above, wherein the generating by the translator further comprises optimizing the regular expression language prior to generating the class specifications.

39. The apparatus of claim 36 above, wherein the optimized regular expression language is aesthetically appealing.

40. The apparatus of claim 36 above, wherein the generating by the translator further comprises generating appropriate property types and class specifications for the class specification corresponding to an enclosing element.

41. The apparatus of claim 23 above, wherein the class specifications follow an event model.

42. The apparatus of claim 23 above, wherein the generating by the translator further comprises generating one or more properties having a property type for the class specification, wherein the property type is selected from a group comprising constrained and bound property types, wherein a change to a property that is constrained can be rejected by another class specification, and a change to a property that is bound results in noting another class specification of the change.

43. The apparatus of claim 23 above, wherein the class specifications include one or more specifications selected from a group comprising (1) a reusable interface class specification, (2) a default implementation class specification, and a handler class specification.

44. The apparatus of claim 23 above, wherein the document is embedded in a script file.

45. An article of manufacture embodying logic for performing a method for converting document schemas to component models for use in an object-oriented computer system, the method comprising the steps of:
  (a) generating one or more object-oriented class specifications in the computer system from one or more document schemas; and
  (b) instantiating one or more objects in the computer system from the class specifications using data contained in one or more documents, wherein the one or more documents comply with the one or more document schemas.

46. The article of manufacture of claim 45 above, wherein the documents are eXtensible Markup Language (XML) documents and the schemas are XML schemas.

47. The article of manufacture of claim 46 above, wherein the schemas are selected from a group including Document Type Definition (DTD) schemas and Document Content Definition (DCD) schemas.

48. The article of manufacture of claim 45 above, wherein the class specifications comprise Java class specifications.

49. The article of manufacture of claim 45 above, wherein the generating step further comprises converting an element defined in the schema into the class specification.

50. The article of manufacture of claim 45 above, wherein the generating step further comprises converting an attribute in the schema into a property of the class specification.

51. The article of manufacture of claim 50 above, wherein the attribute is selected from a group comprising a mandatory attribute, an optional attribute, and a fixed value attribute.

52. The article of manufacture of claim 51 above, wherein the attribute is a mandatory attribute and the generating step further comprises the step of generating set and get methods for the property corresponding to the mandatory attribute, wherein the set method sets a value of the property and the get method gets the value of the property.

53. The article of manufacture of claim 51 above, wherein the attribute is an optional attribute and the generating step further comprises the step of generating has and remove methods for the property corresponding to the optional attribute, wherein the has method determines whether the property exists in the object and the remove method removes the property from the object.

54. The article of manufacture of claim 51 above, wherein the attribute is a fixed value attribute, and the generating step further comprises the step of generating a get method for the property corresponding to the fixed value attribute, wherein the get method retrieves a constant value of the property.

55. The article of manufacture of claim 45 above, wherein the generating step further comprises the step of generating the class specifications in the computer system from the schemas and one or more optional customization specifications.

56. The article of manufacture of claim 55 above, wherein the optional customization specifications define what class names to generate for each entity type.

57. The article of manufacture of claim 45 above, wherein the generating step further comprises the step of generating adapter functions that convert data types in the class specification.

58. The article of manufacture of claim 45 above, wherein the generating step further comprises the step of generating the class specifications from a regular expression language comprising one or more declarations of elements enclosed within an element.

59. The article of manufacture of claim 58 above, wherein the regular expression language includes one or more regular expression operators selected from a group comprising:

(1) a "zero or more" operator, (2) a "one or more" operator, (3) a "one or the other" operator, (4) a "one followed by the other" operator, (5) a "zero or one" operator, (6) a "grouping" operator, and (7) an "any" operator.

60. The article of manufacture of claim 58 above, wherein the generating step further comprises the step of optimizing the regular expression language prior to generating the class specifications.

61. The article of manufacture of claim 58 above, wherein the optimized regular expression language is aesthetically appealing.

62. The article of manufacture of claim 58 above, wherein the generating step further comprises the step of generating appropriate property types and class specifications for the class specification corresponding to an enclosing element.

63. The article of manufacture of claim 45 above, wherein the class specifications follow an event model.

64. The article of manufacture of claim 45 above, wherein the generating step further comprises the step of generating one or more properties having a property type for the class specification, wherein the property type is selected from a group comprising constrained and bound property types, wherein a change to a property that is constrained can be rejected by another class specification, and a change to a property that is bound results in notifying another class specification of the change.

65. The article of manufacture of claim 45 above, wherein the class specifications include one or more specifications selected from a group comprising (1) a reusable interface class specification, (2) a default implementation class specification, and a handler class specification.

66. The article of manufacture of claim 45 above, wherein the document is embedded in a script file.

* * * * *